(12) United States Patent
Miele et al.

(10) Patent No.: US 11,763,225 B2
(45) Date of Patent: *Sep. 19, 2023

(54) PRODUCT PICKING SYSTEM

(71) Applicant: FedEx Supply Chain Logistics & Electronics, Inc., Wilmington, DE (US)

(72) Inventors: Jeremiah Miele, Pittsburgh, PA (US); Gary Giger, Pittsburgh, PA (US)

(73) Assignee: FedEx Supply Chain Logistics & Electronics, Inc., Wilmington, DE (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/365,823

(22) Filed: Jul. 1, 2021

(65) Prior Publication Data

US 2021/0326792 A1  Oct. 21, 2021

Related U.S. Application Data

(63) Continuation of application No. 16/656,361, filed on Oct. 17, 2019, now Pat. No. 11,080,633, which is a continuation of application No. 14/959,579, filed on Dec. 4, 2015, now Pat. No. 10,482,409.

(51) Int. Cl.
  *G06F 7/00* (2006.01)
  *G06Q 10/0631* (2023.01)
  *G06Q 10/087* (2023.01)

(52) U.S. Cl.
  CPC ..... *G06Q 10/06315* (2013.01); *G06Q 10/087* (2013.01)

(58) Field of Classification Search
  CPC .............. G06Q 10/06315; G06Q 10/087
  USPC ............... 700/213, 217; 705/7.25, 7.28
  See application file for complete search history.

(56) References Cited

U.S. PATENT DOCUMENTS

| 7,266,422 B1 * | 9/2007 | DeMotte | B25J 9/1687 |
| | | | 414/801 |
| 9,089,969 B1 | 7/2015 | Theobald | |
| 9,102,055 B1 * | 8/2015 | Konolige | B25J 9/1612 |

* cited by examiner

*Primary Examiner* — Yolanda R Cumbess
(74) *Attorney, Agent, or Firm* — McGuire Woods LLP

(57) ABSTRACT

The disclosed embodiments include product picking systems and methods to pick products. In one embodiment, the system includes a work order module configured to receive a work order to obtain at least one product, obtain a virtual stack of the at least one product based on the work order, the virtual stack being a 3D representation of the at least one product, and determine a set of business rules for selecting each product of the at least one product. The system also includes a vision module configured to identify a first product of the at least one product. The system further includes a processor configured to determine whether the first product satisfies business rules for selecting the first product is satisfied, and configured to operate a robotic arm to select the first product and to arrange the first product to form a physical stack corresponding to the virtual stack.

38 Claims, 8 Drawing Sheets

PRODUCT PICKING SYSTEM

BACKGROUND

The present disclosure relates generally to product picking systems and methods for picking products.

Raw material goods and manufactured goods (collectively "products") are often stored in a warehouse or a distribution center (collectively "warehouse") before the products are shipped out to suppliers, distributors, consumers, and businesses worldwide. Each warehouse often includes a designated slot for each arriving product. Several identical products may be stored at the same designated slot. The designated slot may be based on product type, product velocity, product weight, as well as various other considerations for slotting arriving products.

When an order for the product is received, the product is selected from the product's designated storage slot. An employee, upon receiving instructions to retrieve the product, travels to the location of the warehouse where the product is stored, selects the product, and travels to a loading area of the warehouse, where the product is loaded onto a transportation vehicle and transported to another warehouse or to the purchaser.

SUMMARY

The disclosed embodiments provide systems and methods for picking and arranging products.

In accordance with an illustrative embodiment, a product picking system is provided. The product picking system includes a work order module configured to receive a work order for an automatic vehicle to obtain at least one product. The work order module is further configured to obtain a virtual stack of the at least one product based on the work order, the virtual stack being a three dimensional (3D) representation of the at least one product. The product picking system also includes a vision module. The vision module includes at least one sensor and is configured to identify a first product of the at least one product. The product picking system further includes a processor configured to determine whether a set of business rules for selecting the first product is satisfied. The processor is further configured to operate a robotic arm to select the first product upon determining that the first product satisfies the set of business rules and to arrange the first product to form a physical stack corresponding to the virtual stack upon determining that the first product satisfies the set of business rules.

In accordance with another illustrative embodiment, a machine-readable medium including instructions stored therein, which when executed by one or more processors, causes the one or more processors to perform operations to pick products is provided. The operations include receiving a work order to obtain at least one product. The operations also include generating a virtual stack of the at least one product based on the work order, the virtual stack being a 3D representation of the at least one product. The operations further include guiding an automatic vehicle to a location proximate to a first product of the at least one product. The operations further include identifying the first product of the at least one product at the location proximate to the first product. The operations further include determining, based on a set of business rules for quality assurance, whether the first product passes a quality inspection. The operations further include operating a robotic arm to select the first product upon determining that the first product has passed the quality inspection. The operations further include arranging the first product to form a physical stack corresponding to the virtual stack upon determining that the first product has passed the quality inspection.

In accordance with another illustrative embodiment a method for picking products is provided. The method includes receiving a work order to obtain at least one product. The method also includes determining business rules for stacking the at least one product. The method further includes receiving a virtual stack of the at least one product based on the work order, the virtual stack being a 3D representation of the at least one product. The method further includes determining business rules for selecting the at least one product. The method further includes providing business rules for selecting a first product of the at least one product to an automatic vehicle, where the automatic vehicle is configured to select the first product upon determining that the first product satisfies the business rules for selecting the first product, and where the automatic vehicle is further configured to arrange the first product into a physical stack corresponding to the virtual stack upon selecting the first product.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

Figure 1:
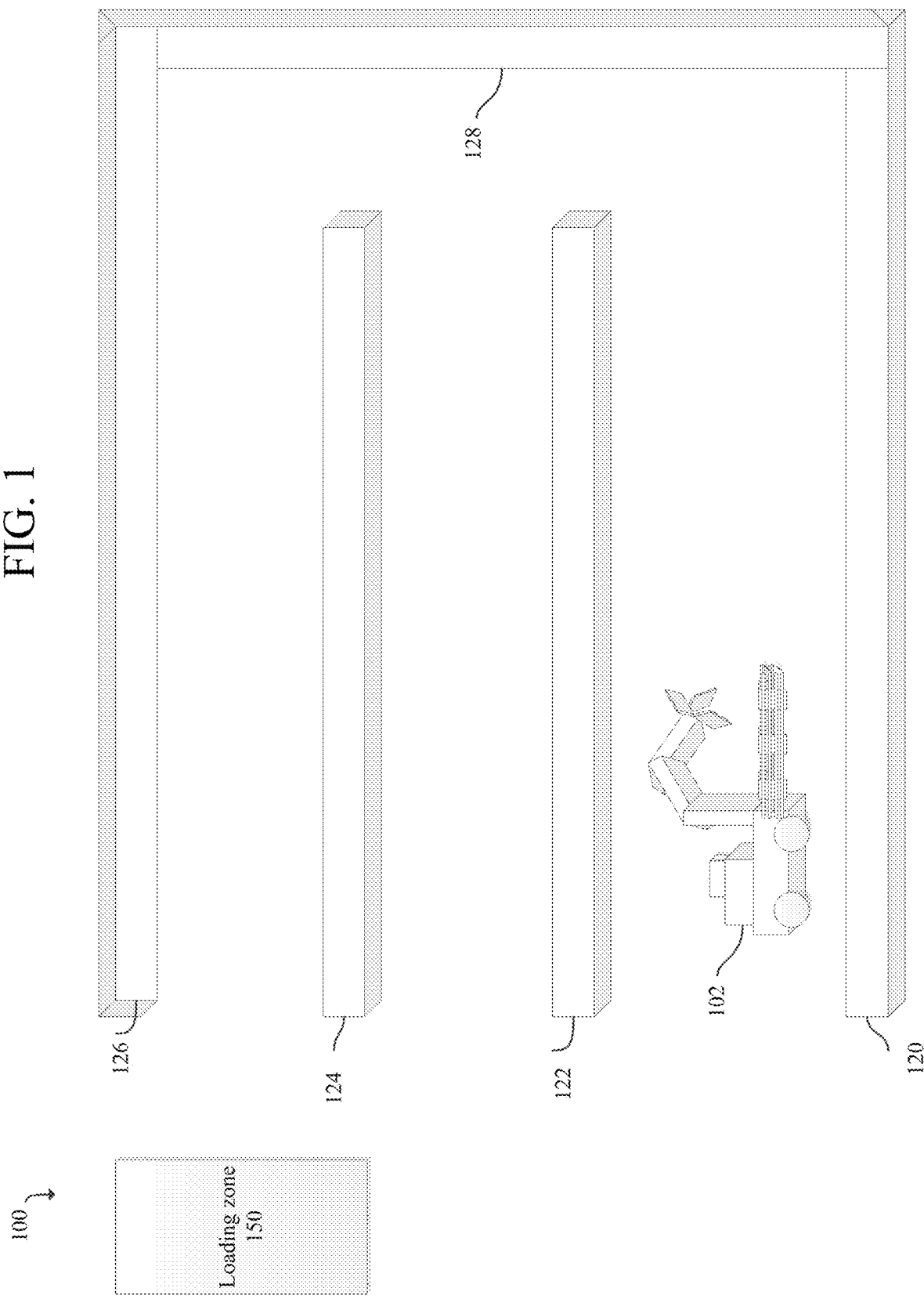
FIG. 1 is a schematic, overhead view of a warehouse environment in accordance with one embodiment.

FIG. 1 is a schematic, overhead view of a warehouse environment 100 in accordance with one embodiment. Products are stored on shelves 120, 122, 124, 126, and 128. A vehicle 102 traverses though the warehouse 100 to obtain various stored products. The obtained products are loaded onto the vehicle 102, brought to the loading zone 150, and are loaded onto a transportation vehicle (not shown) to be transported to another warehouse to the consumer.

Products may be stored on shelves 120, 122, 124, 126, and 128 based on product type, product velocity, product weight, as well as various other considerations for slotting arriving products. In some embodiments, the vehicle 102 is an automatic vehicle. As defined herein, the automatic vehicle includes hardware, software, and firmware that are configured to identify products stored on the shelves 120, 122, 124, 126, and 128, select products from the shelves 120, 122, 124, 126, and 128, arrange the products to form a product stack, transport the products to the loading zone 150 or another designated location, and perform other operations disclosed herein. In some embodiments, the automatic vehicle includes a manual mode that allows the vehicle 102 to be operated by an operator. In other embodiments, the automatic vehicle is an automatic guided vehicle (AGV) configured to traverse the warehouse along a set of predetermined paths without guidance from an operator. In other embodiments, the vehicle 102 is not self-guided and requires an operator to guide to various locations of the warehouse 100. Although the following paragraphs describe various operations performed by the AGV 202, the operations may also be performed by other types of vehicles 102.

Figure 2:
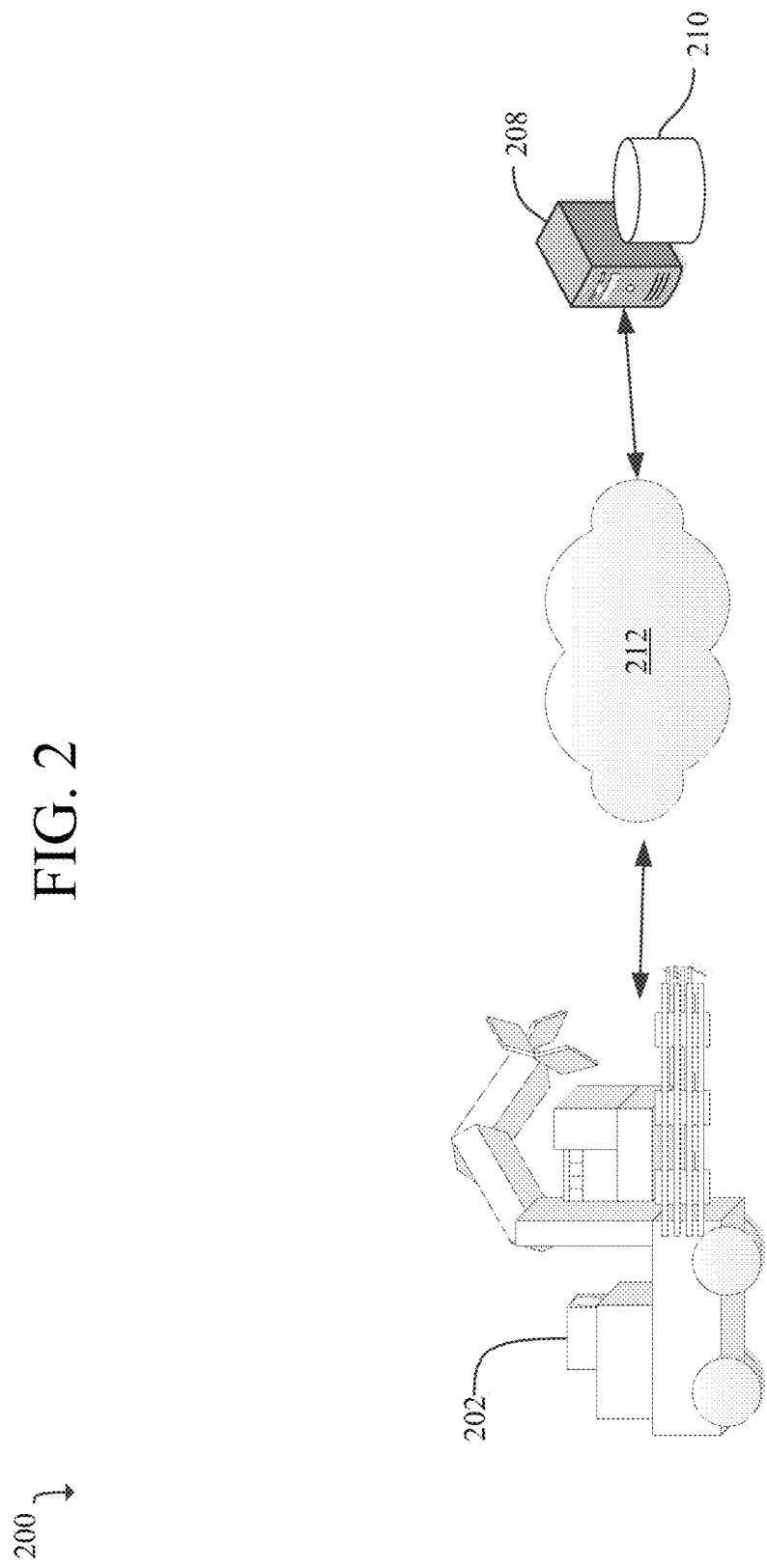
FIG. 2 is a network environment for picking products in accordance with one embodiment.

FIG. 2 is a network environment 200 for picking products in accordance with one embodiment. The network environment 200 includes an AGV 202 communicatively connected to a local management system 208 via a network 212.

The AGV 202 includes sensors such as, but not limited to, video cameras, optical character recognition (OCR) devices, optical machine-readable representation scanners, universal product code (UPC) scanners, stock keeping unit (SKU) scanners, near field communication (NFC) detectors, radio frequency identification (RFID) identification detectors, as well as other similar hardware components operable to identify one or more products of a work order. As used herein, optical machine-readable representation scanners are operable to read and output optical-readable representations of data to the AGV 202, local management system 208, or another electronic device. The optical machine-readable representations of data include various symbologies of numeric-only barcodes, alpha-numeric barcodes, and 2-dimensional barcodes, such as, but not limited to codabar barcodes, UPC-A barcodes, UPC-E barcodes, Postal Numeric Encoding Technique (POSTNET) barcodes, and quick response (QR) codes. Optical machine-readable representation scanners include UPC scanners, SKU scanners, as well as other types of scanners that are operable to read and output data indicative of a product identification or a product condition that is coded in a format similar or identical to a type of barcode. The sensors of the AGV 202 together form vision components and communications components of a vision module of the AGV 202 operable to identify products of the work order. In some embodiments, the sensors are also configured to guide the AGV 202 through various predetermined and/or dynamically determined paths around the warehouse to reach the products of the work order.

The AGV 202 further includes a processor operable to execute instructions to operate the AGV 202, such as to operate a robotic arm component of the AGV 202. In some embodiments, the processor is configured to determine a set of business rules for selecting a product of the work order and to provide instructions to the sensors to identify the product. The processor is further configured to determine if the product identified by the sensors of the AGV 202 satisfies the set of business rules for selecting the product, and to operate a robotic arm component of the AGV 202 to select the identified product. The AGV 202 is further operable to transport the products of the work order to a loading zone, such as the loading zone 150, or to travel to another location of the warehouse to select products of a subsequent work order. In some embodiments, the processor and the sensors operate to guide the AVG 202 to a desirable location in the warehouse. In other embodiments, an operator may manually guide the AGV 202 to the desirable location.

The AGV 202 further includes at least one machine or computer readable medium (storage medium) to store instructions for operating the sensor components, the robotic arm, and other components of the AGV 202. Examples of storage mediums include, but are not limited to, read-only memory (ROM), random access memory (RAM), flash memory, magnetic hard drives, solid state hard drives, CD-ROM drives, DVD drives, floppy disk drives, as well as other types of similar storage mediums. In some embodiments, the storage medium of the AGV 202 also includes one or more work orders. In further embodiments, the storage medium further includes business rules for arranging the products of the work order into a physical stack and instructions on which business rules should be applied to arrange the products of the work order. In further embodiments, the storage medium further includes business rules for selecting the products of the work order and instructions on which business rules should be applied to select the products of the work order.

The AGV 202 further includes a transmitter configured to transmit data indicative of the status of the work order, product selection error messages, as well as other data related to the work order. The AGV 202 further includes a receiver configured to receive data such as, but not limited to, data indicative of locations of the products of the work order, business rules for selecting and for stacking the products of the work order, requests for the AGV 202 to return to the loading zone 150 or to travel to a location to select a new work order, and other instructions related the work order. In some embodiments, the transmitter and the receiver are components of a transceiver that is configured to transmit data from the AGV 202 to other devices such as the local management system 208 and also to receive data from other devices such as from the local management system 208.

The local management system 208 represents one or more electronic devices working together to provide a work order to obtain at least one product to the AGV 202. Each of the one or more electronic devices of the local management system 208 may be any electronic device operable to communicatively communicate with the AGV 202 and having hardware and software configured to provide to the AGV 202 a work order to obtain a product. Examples of the electronic devices that form the local management system 208, include, but are not limited to, laptop computers, desktop computers, tablet computers, smartphones, PDAs, as well as other types of suitable electronic devices described herein.

The local management system 208 includes a processor operable to execute instructions to operate the local management system 208 to provide the work order to the AGV 202. In some embodiments, the processor forms a work order module configured to determine, based on the products included in the work order, a set of business rules for arranging the products of the work order into a physical stack. In one of such embodiments, the processor also obtains, based on the business rules for stacking the products of the work order, a three dimensional virtual representation of the stack of products (virtual stack), the virtual stack having virtual dimensions that correspond to the dimensions of the physical stack. In other embodiments, the processor is configured to determine a set business rules for selecting the products of the work order. The processes to determine the business rules to stack the products and the business rules to select the products are discussed in further detail in the paragraphs below.

The local management system 208 includes a transmitter configured to transmit the work order to the AGV 202 and a receiver configured to receive data, such as a user input for a work order, product information of the products stored in the warehouse, business rules for different products stored within the warehouse, vehicle information of one or more AGVs operating within the warehouse, as well as other information related to storage, selection, and transportation of the products stored within the warehouse. In some embodiments, the transmitter and receiver are components of a transceiver of the local management system 208.

The local management system 208 includes data store 210, which includes one or more storage mediums for storing instructions to operate the local management system 208. Further, the one or more storage mediums also include product information of the products within the warehouse, business rules for selecting the products stored within the warehouse, business rules for stacking different products stored within the warehouse, vehicle information of the AGVs 202 and other AGVs operating within the warehouse, as well as other warehouse operation related information. In some embodiments, the data store 210 includes a pre-existing work order stored on the data store 210. In one of such embodiments, the pre-existing work order may specify a scheduled time to obtain the products of the work order. The processor of the local management system 208, at a time period before the scheduled time for obtaining the products, determines business rules for stacking the products, and obtains a virtual stack based on the determined rules.

In some embodiments, the data store 210 also includes instructions for generating a virtual stack of the products based on the business rules for arranging the work order. In one of such embodiments, the processor of the local management system 208 forms a virtual stacking module configured to execute the instructions to generate the virtual stack based on the determined business rules. In one of such embodiments, the local management system 208 is also configured to provide the generated virtual stack to the AGV 202. In further embodiments, the data store 210 also includes coordinates of various locations within the warehouse, such as but not limited to, global positioning system (GPS) coordinates, global navigation satellite system (GLONASS) coordinates, geographic coordinates, map coordinates, as well as other suitable types of coordinates for navigating through the warehouse. In one of such embodiments, the data store 210 is also configured to provide, via the network 212, the coordinates to the AGV 202 to facilitate the AGV 202 to navigate through the warehouse.

The network 212 can include, for example, any one or more of a cellular network, a satellite network, a personal area network (PAN), a local area network (LAN), a wide area network (WAN), a broadband network (BBN), the Internet, and the like. Further, the network 210 can include, but is not limited to, any one or more of the following network topologies, including a bus network, a star network, a ring network, a mesh network, a star-bus network, tree or hierarchical network, or similar network architecture. In some embodiments, the network 212 includes a wired or wireless networking device (not shown) configured to facilitate communication between the AGV 202 and the local management system 208. Examples of the networking device include, but are not limited to, wired and wireless routers, wired and wireless modems, access points, as well as other types of suitable networking devices described herein.

Although FIG. 2 illustrates the AGV 202 and the local management system 208 communicatively connected via the network 212, additional AGVs, electronic devices, and/or servers may also be communicatively connected to the AGV 202 or the local management system 208 via the network 212. The AGV 202 or the local management system 208 may receive, from one or more of the additional electronic devices or servers, product information, business rules for arranging the products, business rules for selecting the products, GPS coordinates of the warehouse, and other instructions and/or data related to operating and managing the warehouse.

Figure 3:
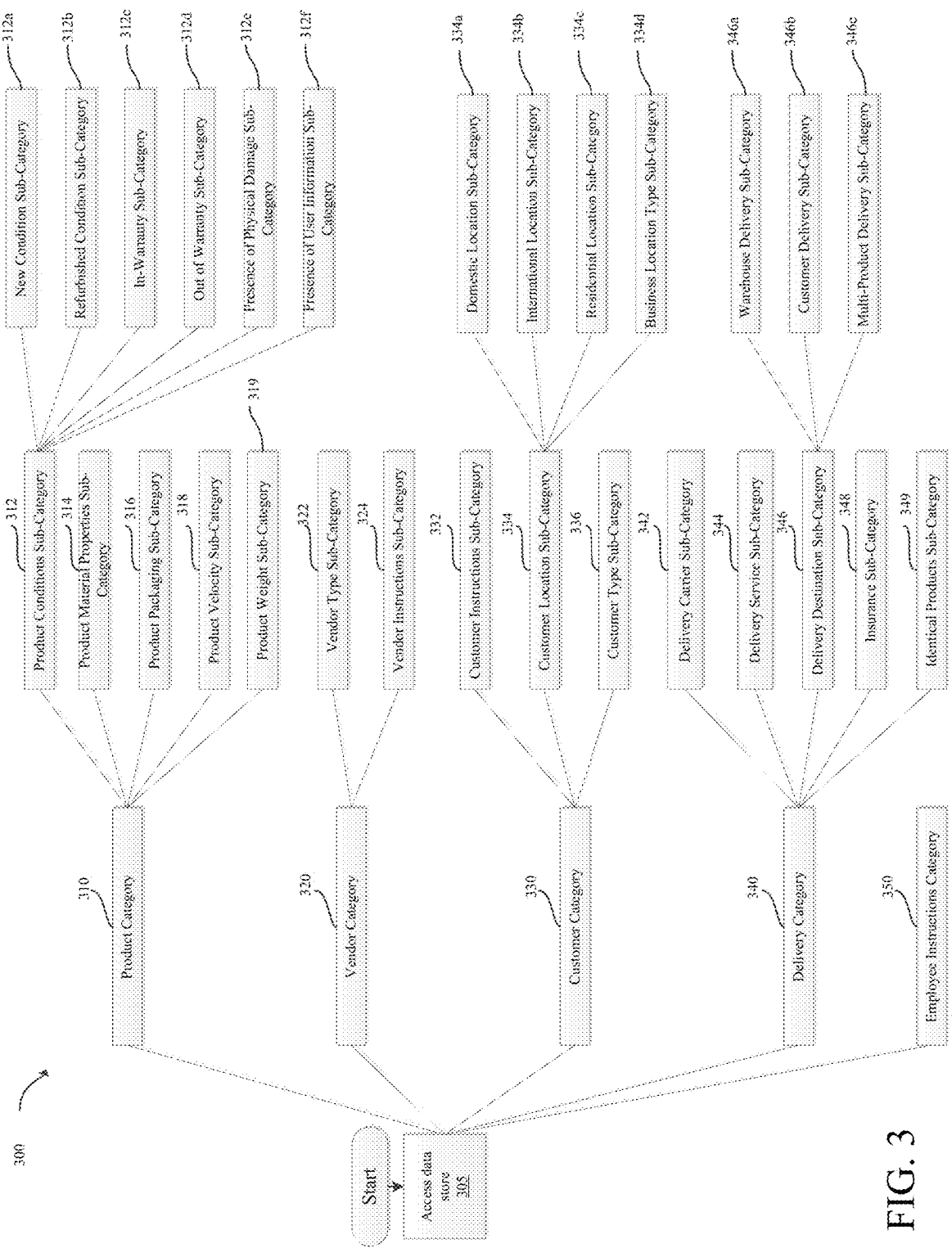
FIG. 3 is a tree diagram illustrating a process for determining applicable business rules for a product of a work order in accordance with one embodiment.

FIG. 3 is a tree diagram 300 illustrating a process for determining applicable business rules for a product of a work order in accordance with one embodiment. Although the paragraphs below describe the operations of the process 300 being performed by a processor of the local management system 208, the process may also be performed by a processor of the AGV 202. Further, although operations in the process 300 are shown in a particular sequence, certain operations may be performed in different sequences or at the same time where feasible. Further, in some embodiments, different combinations of some or all of the steps of the process 300 are performed to determine the applicable business rules for different products of the work order.

The business rules for stacking each product of the work order and the business rules for determining whether to select the product are stored in data store 210 and are categorized into different categories, such as a products category, a vendor category, a customer category, a delivery category, and an employee instructions category. At step 305, the processor, upon receipt of a work order, accesses the data store 210 to determine which set of business rules to apply to stack each product of the work order and which set of business rules to apply to determine whether to select the product of the work order.

At step 310, the processor accesses the product category to determine which product related business rules should be applied to stack the product and/or to select the product. The product category includes product related business rules for stacking the product and/or for selecting the product. The products category is further divided into sub-categories to provide more granular categorization of which set of business rules should be applied to stack the product and/or to select the product. At step 312, the processor accesses the product conditions sub-category to determine applicable product condition business rules for stacking the product and/or for selecting the product. In some embodiments, the product conditions sub-category 312 is further divided into sub-categories based on whether the product is a new product or a refurbished product, whether the product is within warranty or out of warranty, whether any physical damage is present, and whether the product contains user information. In some embodiments, sub-categories 314a-314f specify which business rules to apply to perform a quality assurance inspection of the product.

At step 312a the processor accesses the new condition sub-category if the product is a new product. In some embodiments, the new condition sub-category may include a business rule for selecting the product only if the product is determined to be in a new condition and a business rule for selecting the product only if physical damage is not present. At step 312b, the processor accesses the refurbished condition sub-category if the product is a refurbished product. In some embodiments, the refurbished condition sub-category includes business rules on whether to select the product even if physical damage to the product is present and business rules on the amount of acceptable physical damage. At step 312c or step 312d, the processor accesses the in-warranty sub-category or the out of warranty sub-category if the product is within warranty or out of warranty, respectively. In some embodiments, the business rules for the product do not allow the product to be selected or stacked if the product is determined to be out of warranty. In other embodiments, the out of warranty sub-category includes business rules that specify whether the product may be selected based on how long the product has been out of warranty. At step 312e, the processor accesses the physical damage sub-category to determine business rules for selecting the product. In some embodiments, the business rules for selecting the product are based on the type of the product and the extent of damage to the product. At step 312f, the processor accesses the user information sub-category if the product contains user information. In some embodiments, the business rules for selecting the product are based on the type of the product and whether user information can be permanently removed from the product before the product leaves the warehouse.

Some sub-categories may not be applicable to certain products. In the embodiment illustrated in FIG. 3, business rules exclusive to refurbished products or products that contain user information would not be applicable for determining how to stack or whether to select a new product. In such embodiment, the processor would not perform steps 312b or 312f if the product is a new product. Similarly, the processor would not perform step 312a if the product is a refurbished product. As such, the processor efficiently traverses through the process 300 by only performing steps that are relevant to the product.

At step 314, the processor accesses the product material properties sub-category to determine business rules for arranging the product based on material properties of the product. The product material properties sub-category may include additional sub-categories that specify business rules for stacking the product based on scratch hardness, indentation hardness, toughness, flexural strength, fatigue limit, coefficient of friction, bulk modulus, elasticity, corrosion resistance, as well as other suitable material properties. In some embodiments, the product material properties sub-category includes business rules for determining an overall material property value of the product based on an average or an aggregate of all of the material properties and business rules for stacking the product based on the determined material property value. One of the business rules for stacking the product may specify that the product should be stacked on top if the determined value of the product is below a less than a first threshold. Another one of the business rules for stacking the product may specify that the product should be stacked on the bottom if determined value of the product is greater than or equal to a second threshold, where the second threshold is greater than the first threshold.

In other embodiments, the product material properties sub-category includes business rules for determining a material property value of each material property of the product and business rules that specify how to stack the product based on individual material property values. In one of such embodiments, one of the business rules specifies that the product should be stacked on top if the product is determined to have a material property value for scratch hardness that is less than a first threshold even if all other material property values of the product are much greater than the first threshold. At step 316, the processor accesses the product packaging sub-category. In some embodiments, the product packing sub-category includes additional business rules for arranging the product and/or for selecting the product based on the material properties of product packaging of the product, presence of damage to the product packaging of the product, as well as other types of business rules associated with arranging the product and/or selecting the product based on the product packaging.

At step 318, the processor accesses the product velocity sub-category to determine business rules for arranging the product based on the product velocity of the product. In some embodiments, the business rules for arranging the product specifies that the product should be stacked on top if the product velocity of the product is greater than a threshold. At step 319, the processor accesses the product weight sub-category to determine business rules for arranging the product based on the physical weight of the product. In some embodiments, the business rules for arranging the product specifies that the product should be stacked on the bottom if the product weights greater than a threshold weight. Although FIG. 3 illustrates that the products category 310 is broken down to sub-categories 312, 314, 316, 318, and 319, business rules associated with the product category 310 may be organized into other combinations of sub-categories or may not be organized into any sub-category. As such, the process 300 may include other steps for determining applicable product related business rules for stacking the product and/or for selecting the product.

At step 320, the processor determines business rules for stacking the product and business rules for selecting the product based on a vendor category of the product. The vendor category includes vendor specific business rules for stacking the product and/or for selecting the product. At step 322, the processor accesses the vendor type sub-category. In some embodiments, different vendors that manufacture or supply the same product have different requirements for stacking the product or whether to select the product. As such, different business rules may be applicable for stacking and/or selecting the product based on the vendor type. At step 324, the processor accesses the vendor instructions sub-category if vendor instructions regarding the product are available. In some embodiments, if the vendor has provided specific instructions for the product, such as how to orient the product, whether additional products may be stacked on top or beneath of the product, or other client specific instructions, business rules that implement the instructions are included in the vendor instructions sub-category.

At step 330, the processor determines business rules for stacking the product and business rules for selecting the product based on a customer category of the product. The customer category includes customer related business rules for stacking the product and/or for selecting the product. At step 332, the processor accesses the customer instructions sub-category if customer instructions regarding the product or a similar product are available. In some embodiments, if the customer has provided specific instructions regarding the product, such as how to orient the product, whether additional products may be stacked on top or beneath of the product, or other client specific instructions, business rules that implement the instructions are included in the customer instructions sub-category. In other embodiments, if the customer has provided specific instructions for a similar product, business rules that implement the instructions for the similar product are also included in the customer instructions sub-category.

At step 334, the processor accesses the customer location sub-category to determine applicable business rules for stacking the product. The customer location sub-category is further divided into a domestic location sub-category, an international location sub-category, a residential location sub-category, and a business location sub-category. At steps 334*a* or 334*b*, the processor accesses the domestic location sub-category or the international location sub-category based on whether the customer is a domestic customer or an international customer. In some embodiments, the domestic location sub-category and/or the international location sub-category includes additional sub-categories based on a state/province of the delivery address, a city of the delivery address, a postal code of the delivery address, and/or other defined geographical designations associated with the delivery address. At steps 334*c* or 334*d*, the processor accesses the residential location sub-category or the business location sub-category based on whether the delivery address is a residential location or a business location. The residential location sub-category may include additional sub-categories based on whether the delivery address is to a single family residential building or an apartment complex. At step 336, the processor accesses the customer type sub-category to determine applicable business rules for arranging the product based on the type of the customer. In some embodiments, different business rules are applied to stack the product and/or to select the product based on whether the customer is an individual, a business, a non-profit entity, or a government entity.

At step 340, the processor determines business rules for stacking the product and business rules for selecting the product based on a delivery category of the product. The delivery category includes delivery related business rules for stacking the product and/or for selecting the product. The delivery category is further divided into delivery carrier sub-category, delivery service sub-category, delivery destination sub-category, insurance sub-category, and identical products sub-category. At step 342, the processor accesses the delivery carrier sub-category. In some embodiments, the delivery carrier sub-category includes different business rules for arranging the product based on a type of carrier of the product. At step 344, the processor accesses the delivery service sub-category. In some embodiments, the delivery service sub-category 344 is further subdivided into a weekday delivery service, a weekend delivery service, services that require signature, and other related sub-categories based on delivery services. In such embodiments, each sub-category of the delivery service sub-category includes specific business rules for arranging the product.

At step 346, the processor accesses the delivery destination sub-category. The delivery destination sub-category is further divided into a warehouse delivery sub-category, a customer delivery sub-category, and a multi-product delivery subcategory. At step 346*a* or 346*b*, the processor accesses the warehouse delivery sub-category or the customer delivery sub-category based on whether the product should be delivered to another warehouse or directly to the customer. The warehouse delivery sub-category and the customer delivery sub-category each includes business rules for arranging the product based on whether the product is delivered to another warehouse or whether the product is delivered to a customer. In some embodiments, the warehouse delivery sub-category may be further subdivided into additional sub-categories based on the type of the warehouse, the location of the warehouse, and special instructions regarding delivering to the warehouse.

At step 346*c*, the processor accesses the multi-product delivery subcategory if the product is one of multiple products of the work order are delivered to the same location. In some embodiments, the multi-product delivery sub-category includes a business rule specifying that all products delivered to the same location should be stacked within proximity of each other. At step 348, the processor accesses the insurance sub-category. In some embodiments, the insurance sub-category includes different business rules for stacking the product based on whether the product is insured, the value the product is insured for, and the type of insurance. At step 349, the processor accesses the identical products sub-category if the product is one of multiple identical products of the work order. In some embodiments, the identical products sub-category includes a business rule specifying that all identical products of the work order should be stacked within proximity of each other.

At step 350, the processor determines business rules for stacking the product and business rules for selecting the product based on employee instructions category. The employee instructions category includes business rules for arranging the product and/or for selecting the product based on existing employee instructions. The employee instructions category may further be divided into additional layers of sub-categories such as sub-categories based on product category, vendor category, customer category, and delivery category as illustrated in FIG. 3 to provide additional levels of granularity.

In some embodiments, certain business rules for stacking the product supersedes other business rules for stacking the product. In one of such embodiments, employee instructions regarding how the product should be stacked supersedes all other business rules for stacking the product that contradicts the employee instructions. In some embodiments, different business rules for stacking the at least one product are ranked or weighted in order of priority. In one of such embodiments, employee instructions are ranked highest priority, customer instructions are ranked, second highest priority, and vendor instructions are ranked third highest priority. Additional applicable categories and sub-categories may be stored in the data store 210 and may be considered to determine which business rules should be applied to arrange the product and/or to select the product. In some embodiments, categories that are applicable for determining how to stack the product may not be applicable for determining whether to select the product. In one of such embodiments, business rules in the delivery category may be applicable for determining how to stack the product but may not be applicable for determining whether to select the product. As such, the processor considers business rules exclusive to the delivery category to determine how to stack the product but ignores the same business rules when determining business rules for selecting the product. Further, the processor may simultaneously proceed through multiple steps of the process 300. As such, the process 300 allows the processor to efficiently determine applicable business rules for stacking and/or selecting the product.

The process 300 is repeated for each product of the work order. In some embodiments, the processor may simultaneously perform the process 300 on multiple products of the work order. In some embodiments, some of the business rules for stacking the product may be adjusted based on business rules for stacking another product of the work order. In one of such embodiments, a business rule that specifies where to stack the product based on the type of the delivery carrier may be adjusted if the business rule conflicts with a business rule for another product that satisfies employee instructions on where to stack the other product. In some embodiments, the processor, upon determining the set of business rules for arranging the products of the work order, provides the business rules for stacking the products of the work order to a virtual stacking module to generate a virtual stack based on the determined business rules for stacking the physical stack. In some embodiments, the local management system 208 provides the generated virtual stack, the business rules for stacking the products, and the business rules for selecting the products to the AGV 202. In other embodiments, the processor and the data store are components of the AGV 202. In such embodiments, the processor obtains the virtual stack from the virtual stacking module and provides the instructions to the AGV 202 to travel to a location proximate a product of the work order to determine whether to select the product.

Figure 4:
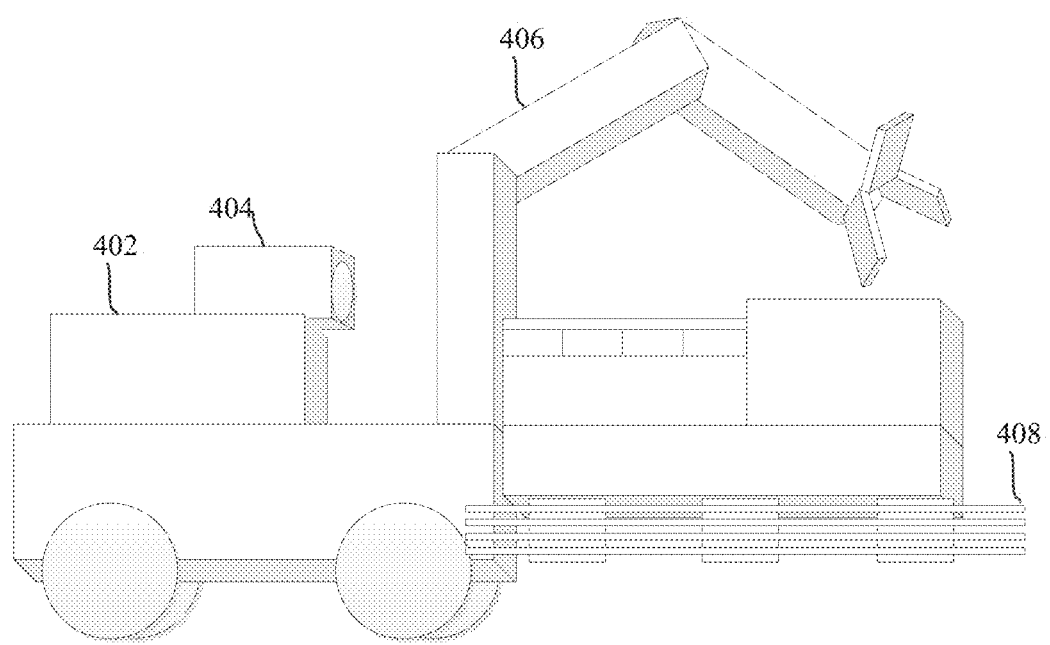
FIG. 4 is a schematic, side view of a vehicle operable to pick products in the warehouse environment of FIG. 1 in accordance with one embodiment.

FIG. 4 is a schematic, side view of a vehicle operable to pick products in the warehouse environment of FIG. 1 in accordance with one embodiment. In the embodiment illustrated in FIG. 4, the vehicle is the AGV 202. The AGV 202 includes sensor components 404, a robotic arm 406, a pallet 408, and a processor (not shown). The AGV 202 is operable to traverse the warehouse along one or more paths. The sensor components 404 include various components such as, but not limited to, video cameras, lasers, optical machine-readable representation scanners such as, but not limited to UPC scanners and SKU scanners, RFID detectors, NFC devices, as well as other devices for identifying products and/or conditions of products of the work order. In some embodiments, the sensor components 404 form hardware components of the vision module. In one of such embodiments, the vision module also includes a dedicated processor and dedicated storage medium. In such embodiment, the dedicated processor is operable to execute instructions and applications stored in the dedicated storage medium to operate the sensor components 404 to perform operations described herein. In another one of such embodiments, the operations are performed by the processor of the AGV 202. In a further embodiment, the operations are performed by a processor of the local management system 208 or by a processor of another electronic device communicatively connected to the sensor components 404.

The AGV 202, upon receipt of a work order and business rules for stacking the products of the work order and/or selecting the products of the work order, traverses the warehouse to the location of a product (a first product) of the work order. In some embodiments, the sensor components 404 guide the AGV 202 along a path to a location proximate to the location of the first product.

In some embodiments, the sensor components 404 are configured to determine one or more indications of the first product. Further, the sensor components 404 are configured to determine, based on the indications of the first product, whether the first product of the work order satisfies the set of business rules for selecting the first product. In one of such embodiments, the optical machine-readable representation scanner of the sensor components 404 is configured to scan the first product to identify an expiration date of the first product. The processor determines, based on the identified expiration date, whether the first product has expired. The processor then determines, based on the set of business rules determined in the process 300, whether to select the product. In one of such embodiments, the sensor components 404 are configured to obtain an image of the first product's product label text, where the product label text includes a product identification of the first product and a product condition of the first product. In such embodiment, the processor is configured to perform an OCR of the image containing the product label text to determine the product identification of the product and the product condition of the product. In another one of such embodiments, the NFC device of the sensor components 404 communicates with the first product and receives an indication of whether the first product contains personal data. The processor then determines whether to select the first product based on the set of business rules determined in the process 300. In a further one of such embodiments, the video camera of the sensor components 404 is configured to identify visible damage to the first product or to the product packaging of the first product. The processor determines the severity of the damage to the first product and to the product packaging of the first product. The processor then determines, based on the set of business rules determined in process 300, whether the damage to the first product or to the product packaging of the first product is too severe to select the first product. The processor operates the robotic arm 406 to select the first product if the product satisfies the set of business rules for selecting the first product and places the first product onto the pallet 408. The processor further operates the robotic arm 406 to arrange the first product based on the business rules for arranging the product as determined in the process 300. In some embodiments, the processor utilizes sensor components described herein that are not onboard the AGV 202 to perform the foregoing operations. In one of such embodiments, the processor is communicatively connected to video camera components located across the warehouse. The video cameras relay images of the warehouse, which are processed by the processor to calculate coordinates of the warehouse and to determine suitable paths for the AGV 202. In another one of such embodiments, RFID detectors located proximate to the first product provide data indicative of the condition of the first product to the processor. In such foregoing embodiments, the sensor components that are not onboard the AGV 202 form external components of the vision module.

The AGV 202, upon selecting the first product and upon arranging the first product to form a portion of the physical stack that matches a corresponding portion the virtual stack, travels to a location in the warehouse proximate to the location of a second product of the work order, where the foregoing process for selecting the first product is repeated for the second product and for each of the remaining products of the work order. In some embodiments, the processor, upon determining not to select the first product, is further configured to operate the robotic arm 406 to move the first product to a designated area for holding products that have not passed the set of business rules for selecting the respective products. In some embodiments, the AGV 202 transmits signals to inform an operator that the first product did not pass the set of business rules for selecting the first product.

Figure 5B:
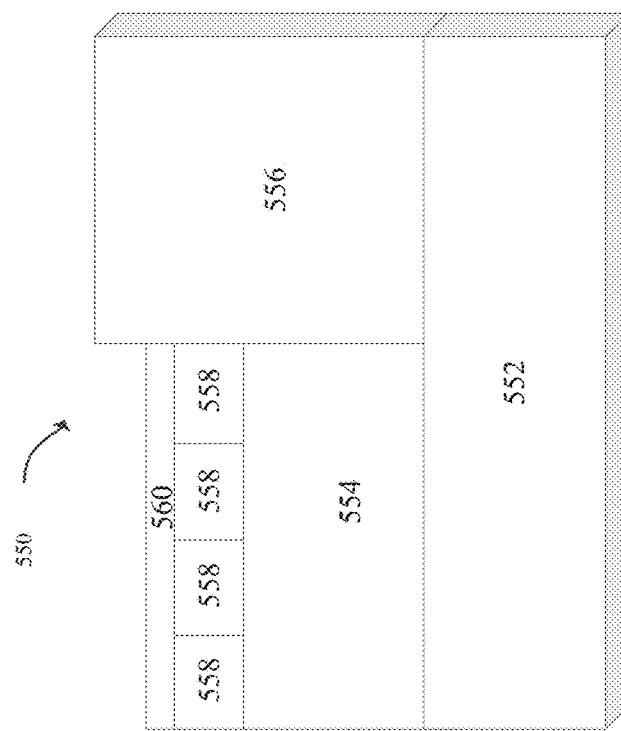
FIG. 5B is a schematic, side view of a three dimensional virtual representation of the physical products of FIG. 5A arranged in a virtual stack in accordance with one embodiment.
Figure 5A:
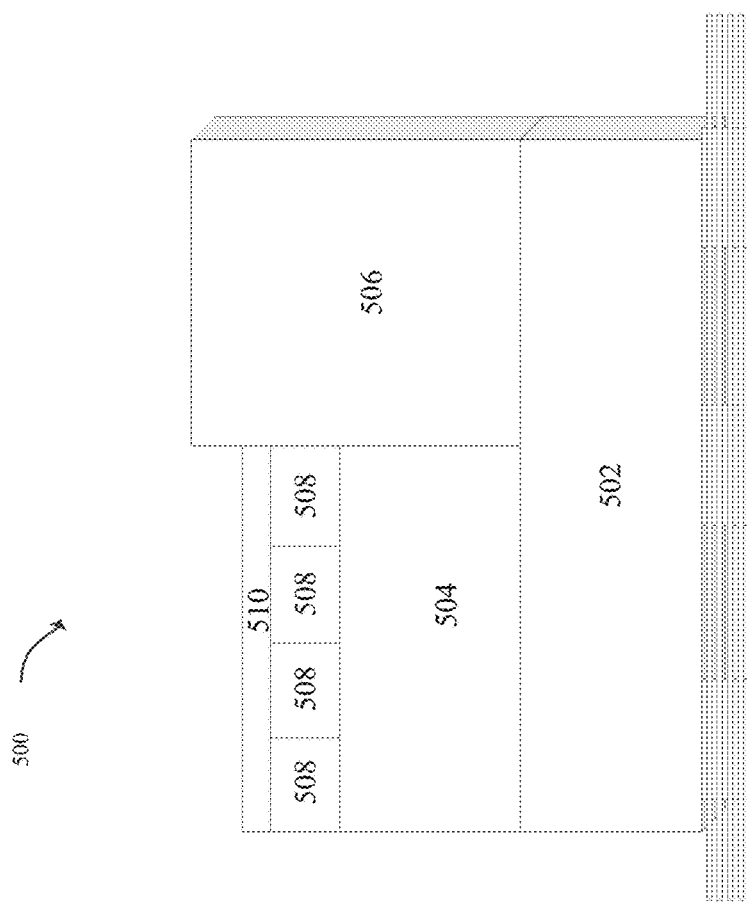
FIG. 5A is a schematic, side view of a physical stack of products of a work order arranged on a pallet of the AGV of FIG. 4 in accordance with one embodiment.

FIG. 5A is a schematic, side view of a physical stack 500 of products of a work order arranged on a pallet of the AGV 202 of FIG. 4 in accordance with one embodiment. In the embodiment illustrated in FIG. 5A, the physical stack 500 includes products 502, 504, 506, 508, and 510. In a preferred embodiment, the processor of the AGV 202, upon determining that all of the products of the work order are selected, determines whether the products are arranged in a physical stack matches the virtual stack of the products of the work order.

FIG. 5B is a schematic, side view of the virtual stack 550 of the physical stack 500 of FIG. 5A arranged in a virtual stack in accordance with one embodiment. In some embodiments, a copy of the virtual stack 550 is stored in the storage medium of the AGV 202. In the embodiment illustrated in FIG. 5B, the virtual stack 550 includes virtual representations of products 552, 554, 556, 558, and 560. The virtual stack 550 has virtual dimensions that correspond to the physical dimensions of the physical stack 500. Further, each product 552, 554, 556, 558, and 560 of the virtual stack has virtual dimensions that match physical dimensions of a corresponding product 502, 504, 506, 508, or 510 of the physical stack 500. As used herein, "match," "matching," or "identical" dimensions are defined to mean identical dimensions or substantially identical dimensions. In some embodiments, the virtual stack 550 is generated based on the products of the work order and the set of business rules for stacking the products of the work order. In some embodiments, the business rules for stacking the physical stack 500 are identical to the business rules for stacking the virtual stack 550. The process to determine business rules for stacking the products of the work order is illustrated in FIG. 3.

In some embodiments, the sensor components 404 and the processor of the AGV 202 operate to determine whether the physical stack 500 matches the virtual stack 550. In some embodiments, the sensor components 404 are configured to determine dimensions of the physical stack 500. In one of such embodiments, a laser or a video camera of the sensor components 404 is configured to scan the physical stack 500 to determine the dimensions of the physical products 500. The processor of the AGV 202 is configured to obtain virtual dimensions of the virtual stack 550, and to compare the dimensions of the physical stack 500 with virtual dimensions of the virtual stack 550 to determine if the dimensions of the physical stack 500 match the dimensions of the virtual stack 550.

In some embodiments, the sensor components are configured to determine a number of edges of the physical stack 500 and a location of each edge of the physical stack 500. In one of such embodiments, the laser or video camera of the sensor components 404 is configured to scan the physical stack 500 to determine the number of edges present and the location of each edge. The processor of the AGV 202 is configured to obtain the number of edges of the virtual stack 550 and the location of each edge of the virtual stack 550. The processor is further configured to compare the number of edges of the physical stack 500 with the number of edges of the virtual stack 550. The processor is further configured to compare the location of each edge of the physical stack 500 with the location of a corresponding edge of the virtual stack 550 to determine if the dimensions of the physical stack 500 match the dimensions of the virtual stack 550.

In further embodiments, the sensor components 404 are further configured to determine dimensions of each product 500, 504, 506, 508, and 510 of the physical stack 500. Further, the processor is configured to obtain virtual dimensions of each product 552, 554, 556, 558, and 560 of the at least one product arranged in the virtual stack 550. The processor is further configured to compare the dimensions of each product 502, 504, 506, 508, and 510 of the physical stack 500 with the virtual dimensions of a corresponding product 552, 554, 556, 558, and 560 of the virtual stack 550.

In further embodiments, a SKU scanner of the sensor components 404 is configured to obtain SKU identifications of each product 502, 504, 506, 508, and 510 of the physical stack 500. Further, the processor is configured to obtain SKU identifications of each corresponding product 552, 554, 556, 558, and 560 of the virtual stack 550. The processor is further configured to compare the SKU identifications of products 502, 504, 506, 508, and 510 of the physical stack 500 with the SKU identifications of the products 552, 554, 556, 558, and 560 of the virtual stack 550 to determine whether the physical stack 500 matches with the virtual stack 550.

In further embodiments, a RFID detector component of the sensor components 404 is configured to obtain a RFID of each product 502, 504, 506, 508, and 510 of the physical stack 500. Further, the processor is configured to obtain a RFID of each corresponding product 552, 554, 556, 558, and 560 of the virtual stack 550. The processor is further configured to compare the RFIDs of products 502, 504, 506, 508, and 510 of the physical stack 500 with the RFIDs of the products 552, 554, 556, 558, and 560 of the virtual stack 550 to determine whether the physical stack 500 matches the virtual stack 550.

In some embodiments, the processor is further configured to determine if the physical stack 500 can be rearranged to match the dimensions of the virtual stack. In one of such embodiments, the processor is further configured to operate the robotic arm to rearrange the physical stack 500 to match the dimensions of the virtual stack 550 upon determining that the physical stack 500 can be rearranged to match the dimensions of the virtual stack 550. In some embodiments, the processor is further configured to transmit an error message upon determining that the dimensions of the physical stack 500 do not match the dimensions of the virtual stack 550 or upon determining that the dimensions of the physical stack 500 cannot be rearranged to match the dimensions of the virtual stack 550.

In some embodiments, the AGV 202, upon selecting the products 502, 504, 506, 508, and 510, transports the products the products 502, 504, 506, 508, and 510 to the loading zone 150. The local management system 208 operates sensor components at the loading zone 150 to determine whether the physical stack 500 matches the virtual stack 550. Examples of sensor components include various components such as, but not limited to, video cameras, lasers, optical machine-readable representation scanners such as, but not limited to UPC scanners and SKU scanners, RFID detectors, and NFC devices. The local management system 208 then instructs the robotic arm 404 of the AGV 202 or another device to rearrange the physical stack 500 to match the virtual stack if the dimensions of the physical stack 500 do not match the dimensions of the virtual stack 550.

Figure 6A:
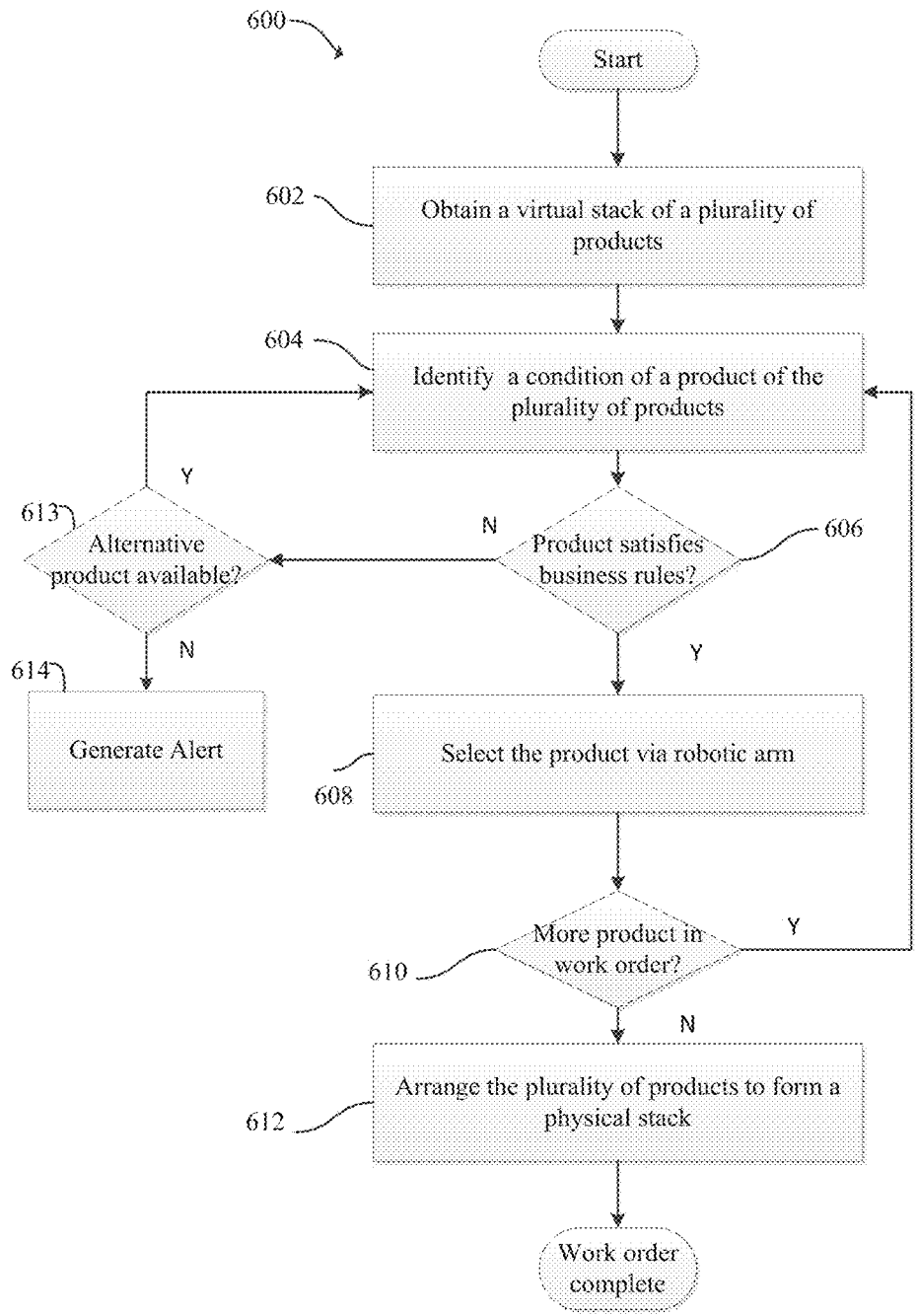
FIG. 6A is a flowchart illustrating a process for picking products in accordance with one embodiment.

FIG. 6A is a flowchart illustrating a process 600 for picking products in accordance with one embodiment. Although the paragraphs below describe the operations of process 600 being performed by the AGV 202 illustrated in FIG. 2, certain steps of the process 600 can also be performed by the local management system 208. Further, although operations in the process 600 are shown in a particular sequence, certain operations may be performed in different sequences or at the same time where feasible.

At step 602, the AGV 202 obtains a virtual stack for a plurality of products, the virtual stack being a three dimensional representation of a desired arrangement of a plurality of products of a work order. At step 604, the AGV 202 identifies one or more indications of a condition of a product (the "first product") of the plurality of the products. At step 606, the AGV 202 determines, based on the one or more indications of the condition of the first product, whether the first product satisfies a set of business rules for selecting the product. In particular, the AGV 202 applies the set of applicable business rules determined in process 300 to determine whether the first product satisfies the set of business rules for selecting the first product. If the AGV 202 determines that the first product does not satisfy the set of business rules for selecting the product, then the process proceeds to step 613, and the AGV 202 determines if an alternative product is available. If the AGV 202 determines that an alternative product is available, the process proceeds to step 604 and the AGV 202 proceeds to identify indications of a condition of the alternative product. Alternatively, if the AGV 202 determines that an alternative product is not available, then the process proceeds to step 614, and the AGV 202 generates an alert indicating that the product cannot be selected and that no alternative product is available. Alternatively, if the AGV 202 determines that the first product satisfies the set of business rules for selecting the first product, then the process proceeds to step 608, and the first product is selected by a robotic arm component of the AGV 202.

At step 610, the AGV 202 determines whether the work order includes additional products that have not been selected by the robotic arm. If the work order includes additional products that have not been selected by the robotic arm, the process proceeds to step 604, and the AGV 202 identifies one or more indications of a condition of a next product (the "second product") of the work order. Alternatively, if all of the products of the work order have been selected by the robotic arm, the process proceeds to step 612, and the robotic arm arranges the selected products of the work order to form a physical stack. Additional example sub-steps of the process for arranging the products of the work order are illustrated in FIG. 6B and discussed in detail in the paragraphs below.

Figure 6B:
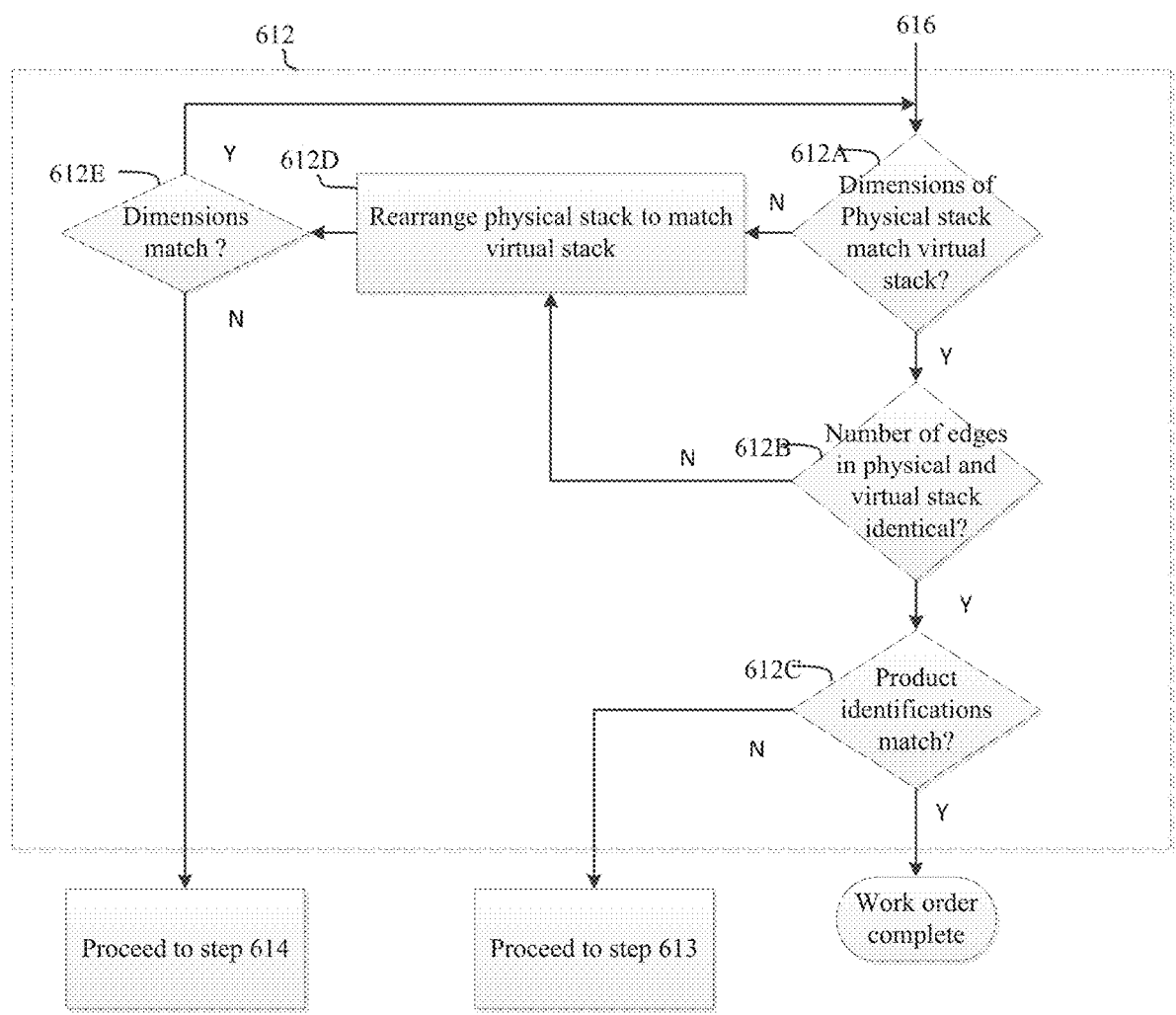
FIG. 6B is a flowchart further illustrating the process for arranging the products to form a physical stack in accordance with one embodiment.

FIG. 6B is a flowchart further illustrating the process 612 for arranging the products to form a physical stack in accordance with one embodiment. Although operations illustrated in FIG. 6B are shown in a particular sequence, certain operations may be performed in different sequences or at the same time where feasible. Further, in some embodiments, different combinations of some or all of the steps illustrated in FIG. 6B are performed to arrange the products to form a physical stack.

At step 612A, the AGV 202 determines whether the dimensions of the physical stack of products of the work order match the dimensions of the virtual stack. If the dimensions of the physical stack of products of the work order do not match with the dimensions of the virtual stack, the process proceeds to step 612D and the AGV 202 rearranges the physical stack to match the virtual stack. The process then proceeds to step 612E and the AGV 202 determines whether the rearranged physical stack matches the virtual stack. If the AGV 202 determines that the rearranged physical stack still does not match with the virtual stack, then the process proceeds to step 614 and the AGV 202 generates an alert indicating that the products cannot be arranged to form a physical stack that matches the virtual stack of the products. Alternatively, if the AGV 202, at step 612E, determines that the dimensions of the rearranged physical stack match the dimensions of the virtual stack, the process proceeds to step 612A.

If the AGV 202, at step 612A, determines that the dimensions of the physical stack match the dimensions of the virtual stack, the process proceeds to step 612B. At step 612B, the AGV 202 determines if the edges of the physical stack and the edges in the virtual stack are identical. As used herein, "match," "matching," or "identical" edges or number of edges are defined to mean identical edges or number of edges, or substantially identical edges or number of edges. If the AGV 202 determines that the edges of the physical stack and the edges of the virtual stack are not identical, then the process proceeds to step 612D and the AGV 202 attempts to rearrange the physical stack. Alternatively, if the AGV 202 determines that the edges of the physical stack and the edges of the virtual stack are identical, then the process proceeds to step 612C, and the AGV 202 determines if the product identifications of the products of the physical stack match the product identifications of the products of the virtual stack. If the AGV 202 determines that the product identifications of the products of the physical stack do not match the product identifications of the products of the virtual stack, then the process proceeds to 613.

At step 613, the AGV 202 determines if an alternative product with a product identification that matches a product identification of a product included in the virtual stack but is absent from the physical stack may be obtained. Alternatively, if the product identifications of the products of the physical stack match the product identifications of the products of the virtual stack, then the work order is complete. In some embodiments, if the AGV 202 may arrange the products of the physical stack based on additional factors discussed herein as well as based on other suitable factors to match the physical stack with the virtual stack before completing the work order.

Figure 7:
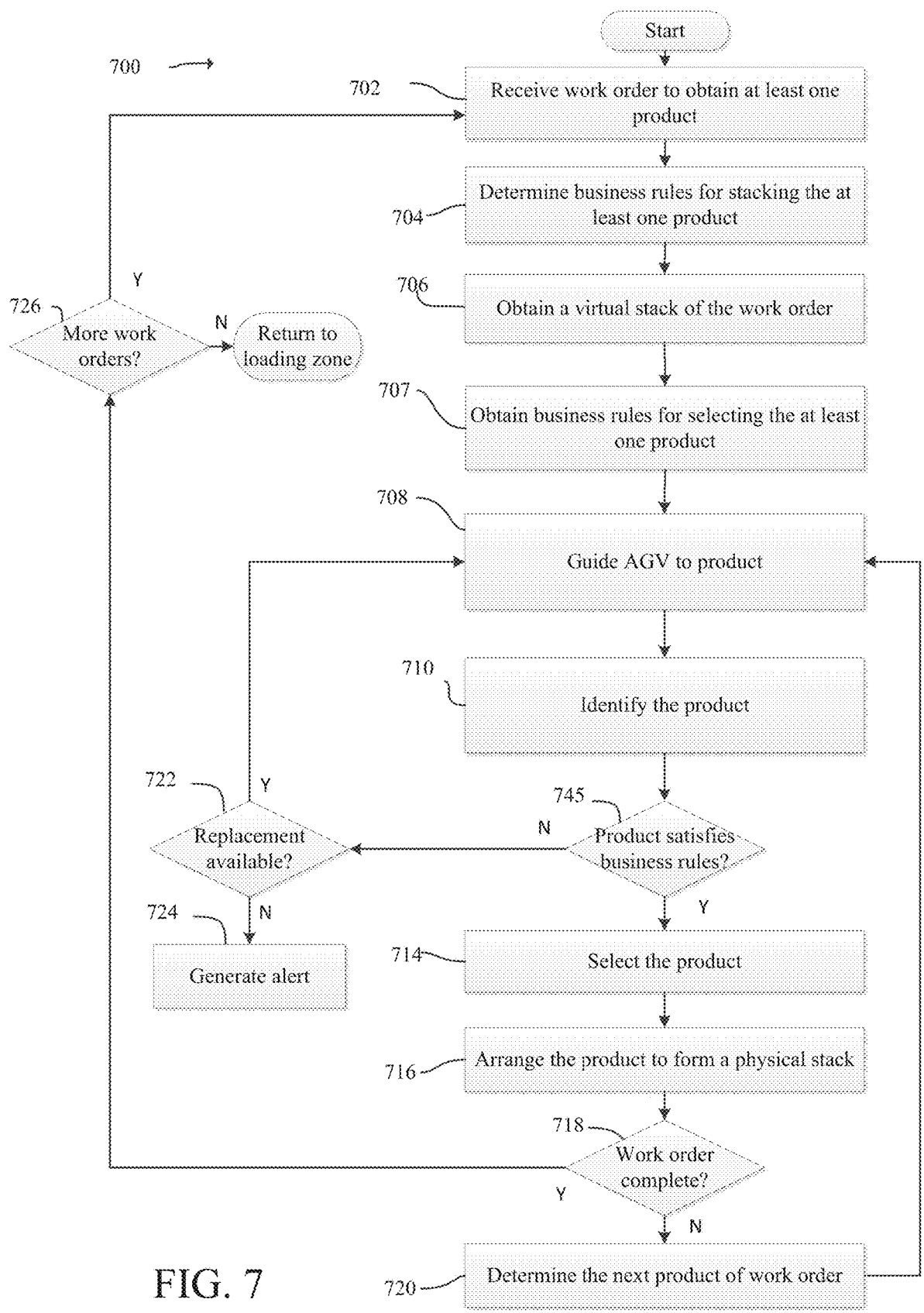
FIG. 7 is a flowchart illustrating a process for picking products in accordance with another embodiment.

FIG. 7 is a flowchart illustrating a process 700 for picking products in accordance with another embodiment. Although the paragraphs below describe the operations of process 700 being performed by the AGV 202 illustrated in FIG. 2, certain steps of the process 700 can also be performed by the local management system 208. Further, although operations in the process 700 are shown in a particular sequence, certain operations may be performed in different sequences or at the same time where feasible.

At step 702, the AGV 202 receives a work order to obtain at least one product. At step 704, the AGV 202 determines a set of business rules for stacking the at least one product of the work order. The AGV 202 determines the applicable business rules for stacking the at least one product based on the process 300 illustrated in FIG. 3. At step 706, the AGV 202 obtains a virtual stack of the work order. At step 707, the AGV 202 obtains business rules for selecting the at least one product of the work order.

At step 708, the AGV 202 is guided to a product of the at least one product of the work order (the "first product"). At step 710, a sensor component of the AGV 202 identifies the first product. The sensor component also obtains indications of the condition of the first product. At step 712, the processor of the AGV 202 determines, based on the conditions of the first product, whether the first product satisfies business rules for selecting the first product, where the business rules for selecting the first product are determined based on the process 300 illustrated in FIG. 3. If the processor of the AGV 202 determines that the product does not satisfy all of the business rules for selecting the product, then the process proceeds to step 722 and the processor determines whether a replacement product is available. In some embodiments, the AGV 202 is further configured to provide an electronic or visual indication that the product has not passed all of the business rules for selecting the product. In one of such embodiments, the AGV 202 is configured to specify one or more business rules that the product did not satisfy. In a further embodiment, the AGV 202 is configured to place the product in an area designated for products that have not passed one or more business rules for selecting said products before determining whether a replacement product is available.

If a replacement product is available, then the process proceeds to step 708 and the AGV 202 is guided to a location proximate to the replacement product. Alternatively, if a replacement product is not available, then the process proceeds to step 724 and an alert is generated indicating the first product cannot be selected and that a replacement first product is not available. If the AGV 202, at step 712 determines that the first product satisfies all of the business rules for selecting the first product, then the process proceeds to step 714, and the first product is selected by the robotic arm component of the AGV 202. The AGV 202, at step 716, arranges the first product to form a portion of the physical stack based on the orientation and location of the first product in the virtual stack. At step 718, the AGV 202 determines whether all of the products of the work order have been selected and the products of the work order have been arranged to form a physical stack that matches the virtual stack to complete the work order. If the AGV 202 determines that the work order is not complete, then the process proceeds to step 720, and the AGV 202 determines the next product (the "second product") of the at least one product of the work order. The process then proceeds to step 708 and the AGV 202 is guided to a location proximate to the second product of the work order.

If the AGV 202, at step 718 determines that the work order is complete, then the process proceeds to step 726, and the AGV 202 determines whether the AGV 202 has been assigned to fill another work order. If the AGV 202 determines that no further work orders has been assigned, then the AGV 202 returns to loading zone 150 to unload the work order. Alternatively, if the AGV 202 determines that an additional work order has been assigned, the process proceeds to step 702 and the AGV 202 receives the additional work order to obtain at least one product of the additional work order.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A product picking system,
the system comprising: a work order module configured to:
receive a work order for an automatic vehicle to obtain at least one product; obtain a virtual stack of the at least one product based on the work order, the virtual stack being a three dimensional (3D) representation of the at least one product; and
determine a set of business rules for selecting each product of the at least one product;
a vision module comprising at least one sensor and configured to identify a first product of the at least one product;
a processor configured to:
determine whether the first product satisfies the set of business rules for selecting the first product; and
operate a robotic arm to:
select the first product; and
arrange the first product to form a physical stack corresponding to the virtual stack upon determining that the first product satisfies the set of business rules; and
wherein the work order module is further configured to:
receive an indication that the work order is complete; and
obtain a virtual stack of additional products for a new work order.

2. The system of claim 1, wherein the work order module is further configured to:
provide the work order and a set of business rules for stacking the at least one product to a virtual stacking module;
request the virtual stacking module to create the virtual stack of the at least one product based on the work order and the set of business rules for stacking the at least one product; and
receive the virtual stack of the at least one product from the virtual stacking module.

3. The system of claim 2, wherein the set of business rules for stacking each product of the at least one product are organized based on at least one of a product type, a vendor type, a customer type, a delivery type, and employee instructions of the respective product, and wherein the work order module is further configured to determine the set of business rules for stacking each product of the at least one product based on at least one of the product type, a vendor type, a customer type, a delivery type, and employee instructions of the respective product.

4. The system of claim 3, wherein the set of business rules for stacking the product based on the product type comprises business rules for stacking the product based on at least one of a product condition, product material properties, product packaging, product velocity, and product weight of the product.

5. The system of claim 3, wherein the set of business rules for stacking the product based on the vendor type comprises business rules for stacking the product based on at least one vendor instructions regarding the product.

6. The system of claim 3, wherein the set of business rules for stacking the product based on the customer type comprises business rules for stacking the product based on at least one of customer instructions, a customer location, and a customer type.

7. The system of claim 3, wherein the set of business rules for stacking the product based on the delivery type comprises business rules for stacking the product based on at least one of a delivery carrier type, a delivery service type, a delivery destination type, and insurance type.

8. The system of claim 1, wherein the set of business rules for selecting the first product comprises a set of business rules for quality assurance.

9. The system of claim 8, wherein the processor is configured to determine whether to select the first product based on a product condition of the first product.

10. The system of claim 9, wherein the processor is configured to determine whether to select the first product based on presence of damage to the first product of a product packaging of the first product.

11. The system of claim 9, wherein the processor is configured to determine whether to select the first product based on presence of user data stored by the first product.

12. The system of claim 8, wherein the processor is configured to determine whether to select the first product based on a warranty period or expiration date of the first product.

13. The system of claim 1, wherein the set of business rules for selecting the first product are based on at least one of a product type of the first product.

14. The system of claim 13, wherein the set of business rules for selecting the first product based on product type is based on material properties of the product.

15. The system of claim 13, wherein the set of business rules for selecting the first product is based on product packaging of the product.

16. The system of claim 1, wherein the set of business rules for selecting the first product is based on at least one employee instructions regarding the product.

17. The system of claim 1, further comprising a transceiver configured to receive signals indicating a condition of the first product, and wherein the processor is further configured to determine whether to select the first product based on the indicated condition of the first product in accordance with the set of business rules for selecting the first product.

18. The system of claim 1, wherein the vision system is further configured to guide the automatic vehicle to a location proximate to the first product of the at least one product.

19. The system of claim 1, wherein the work order module is further configured to:

receive an indication that the at least one product has been arranged into the physical stack corresponding to the virtual stack; and request the vision module to guide the automatic vehicle to a product loading zone for loading of the at least one product.

20. The system of claim 1, further comprising a notification module configured to transmit a notification to an operator if the processor determines not to select the first product.

21. The system of claim 1, wherein the work order module, the vision module, and the processor are components of the automatic vehicle.

22. A non-transitory machine-readable medium comprising instructions stored therein, which when executed by one or more processors, causes the one or more processors to perform operations comprising:

receiving a work order to obtain at least one product;

generating a virtual stack of the at least one product based on the work order, the virtual stack being a 3D representation of the at least one product;

guiding an automatic vehicle to a location proximate to a first product of the at least one product;

identifying the first product of the at least one product at the location proximate to the first product;

determining, based on a set of business rules for quality assurance, whether the first product passes a quality inspection;

operating a robotic arm to select the first product upon determining that the first product has passed the quality inspection; and arranging the first product to form a physical stack corresponding to the virtual stack upon determining that the first product has passed the quality inspection.

23. A method for picking products, the method comprising:

receiving a work order to obtain at least one product;

determining business rules for stacking the at least one product;

receiving a virtual stack of the at least one product based on the work order, the virtual stack being a 3D representation of the at least one product;

determining business rules for selecting the at least one product, wherein determining business rules for selecting the at least one product comprises determining a set of business rules for selecting the first product based on material properties of the product; and providing business rules for selecting a first product of the at least one product to an automatic vehicle, wherein the automatic vehicle is configured to select the first product upon determining that the first product satisfies the business rules for selecting the first product, and wherein the automatic vehicle is further configured to arrange the first product into a physical stack corresponding to the virtual stack upon selecting the first product.

24. The method of claim 23, wherein determining business rules for selecting the at least one product comprises determining a set of business rules for selecting the first product based on at least one of a product type of the first product.

25. The method of claim 23, wherein determining business rules for selecting the at least one product comprises determining a set of business rules for selecting the first product based on product packaging of the product.

26. The method of claim 23, wherein determining business rules for selecting the at least one product comprises determining a set of business rules for selecting the first product based on at least one employee instructions regarding the product.

27. The method of claim 23, further comprising:
receiving an indication that the work order is complete; and
obtaining a virtual stack of additional products for a new work order.

28. The method of claim 23, wherein determining business rules for stacking the at least one product further comprises:
providing the work order and a set of business rules for stacking the at least one product to a virtual stacking module; and
requesting the virtual stacking module to create the virtual stack of the at least one product based on the work order and the set of business rules for stacking the at least one product.

29. The method of claim 28, wherein determining business rules for stacking the at least one product further comprises determining the business rules for stacking each product of the at least one product based on at least one of the product type, a vendor type, a customer type, a delivery type, and employee instructions of the respective product.

30. The method of claim 29, wherein determining the business rules for stacking each product of the at least one product based on the product type comprises determining the business rules for stacking each product of the at least one product based on at least one of a product condition, product material properties, product packaging, product velocity, and product weight of the product.

31. The method of claim 29, wherein determining the business rules for stacking each product of the at least one product based on the vendor type comprises determining the business rules for stacking each product of the at least one product based on at least one vendor instructions regarding the product.

32. The method of claim 29, wherein determining the business rules for stacking each product of the at least one product based on the customer type comprises determining the business rules for stacking each product of the at least one product based on at least one of customer instructions, a customer location, and a customer type.

33. The method of claim 29, wherein determining the business rules for stacking each product of the at least one product based on the delivery type comprises determining the business rules for stacking each product of the at least one product based on at least one of a delivery carrier type, a delivery service type, a delivery destination type, and insurance type.

34. The method of claim 23, wherein determining business rules for selecting the at least one product comprises determining a set of business rules for selecting the first product based on quality assurance.

35. The method of claim 34, wherein determining business rules for selecting the at least one product based on quality assurance comprises determining whether to select the first product based on a product condition of the first product.

36. The method of claim 34, wherein determining whether to select the first product based on quality assurance comprises determining whether to select the first product based on presence of damage to a product packaging of the first product.

37. The method of claim 34, wherein determining whether to select the first product based on quality assurance comprises determining whether to select the first product based on presence of user data stored by the first product.

38. The method of claim 34, wherein determining whether to select the first product based on quality assurance comprises determining whether a warranty period of the first product is in effect.

* * * * *